United States Patent

Rinne et al.

[11] Patent Number: 6,081,432
[45] Date of Patent: Jun. 27, 2000

[54] ACTIVE RESET FORWARD CONVERTER EMPLOYING SYNCHRONOUS RECTIFIERS

[75] Inventors: Karl Rinne, Ardmore; Joseph Duigan, Killeagh; Frank Keane, Dungarvan, all of Ireland

[73] Assignee: Artesyn Technologies, Inc., Eden Prairie, Minn.

[21] Appl. No.: 09/153,377

[22] Filed: Sep. 15, 1998

Related U.S. Application Data

[60] Provisional application No. 60/086,835, May 26, 1998.

[51] Int. Cl.⁷ ................................................. H02M 3/335
[52] U.S. Cl. ............................... 363/16; 363/17; 363/20
[58] Field of Search ................................. 363/16, 17, 20, 363/21, 19; 307/109

[56] References Cited

U.S. PATENT DOCUMENTS

| Re. 36,098 | 2/1999 | Vinciarelli | 363/20 |
|---|---|---|---|
| 4,441,146 | 4/1984 | Vinciarelli | 363/20 |

(List continued on next page.)

FOREIGN PATENT DOCUMENTS

| 0 618 666 A2 | 10/1994 | European Pat. Off. ....... H02M 3/335 |

OTHER PUBLICATIONS

Alexander et al., "MOSFET's Move in On Low Voltage Rectification", Applications Handbook, Siliconix Technology Article, Siliconix Inc., pp. 569–580, 1984; No Month.

Acker, et al., "Current–Controlled Synchronous Rectification", Ninth Annual Applied Power Electronics Conference and Exposition, vol. 1, pp. 185–191, Feb. 13–17, 1994.

Jitaru, et al., "High Efficiency DC–DC Converter", IEEE, Apec '94, ninth Annual Applied Power Electronics Conference and Exposition, vol. 2, pp. 638–644, Feb. 13–17, 1994.

Tarter, "Principles of Solid–State Power Conversion", pp. 544–547, 1985, No Month.

Jitaru, "Constant Frequency, Forward Converter With Resonant Transition", High Frequency Power Conversion 1991 Conference, Proceedings 1, pp. 282–292, Jun. 1991.

Murakami, et al., "A Simple and Efficient Synchronous Rectifier for Forward DC–DC Converters", Apec '93, Eighth Annual Applied Power Electronics Conference and Exposition, pp. 463–468, Mar. 7–11, 1993.

Kagan, et al., "Improving Power Supply Efficiency With MOSFET Synchronous Rectifiers", Proceeding of Powercon 9, Ninth International Solid–State Power Electronics Conference, pp. 1–5, Jul. 13–15, 1982.

Tabisz, et al., "A MOSFET Resonant Synchronous Rectifier For High Frequency DC/DC Converters", PESC '90 Record vol. II, 21 Annual IEEE Power Electronics Specialist Conference, pp. 769–779, 1990, No Month.

Carsten, et al., "Design Tricks And Tribulations at High Conversion Frequencies", HFPC Apr. 1987 Proceedings, pp. 139–152.

Blanc, "Practical Application Of MOSFET Synchronous Rectifiers", Intelec '91, pp. 495–501, (Nov. 1991).

Carsten, "High Power SMPS Require Intrinsic Reliability", PCI '81 Proceedings Conference, Sep. 14–17.

*Primary Examiner*—Edward H. Tso
*Assistant Examiner*—Rajnikant B. Patel
*Attorney, Agent, or Firm*—Kirkpatrick & Lockhart LLP

[57] ABSTRACT

A converter comprises a first switch (102) for connecting an input DC voltage to a primary winding (103) of a transformer (104), a second switch (105) for connecting a reset voltage to the transformer, and first and second synchronous rectifiers (109, 110) within a filter circuit (108) for receiving an output voltage waveform from a secondary winding (107) of the transformer and generating therefrom a DC output voltage. The synchronous rectifiers are controlled by the secondary winding. A first one of the synchronous rectifiers (109) couples the secondary winding to an output terminal of the power supply to provide output power during part of the switching cycle. The second synchronous rectifier (110) serves as a "flywheel" for providing load current during a second part of the switching cycle when the first synchronous rectifier is off. The timing of the first and second switches is arranged to prevent simultaneous conduction of the synchronous rectifiers.

34 Claims, 8 Drawing Sheets

U.S. PATENT DOCUMENTS

| | | | |
|---|---|---|---|
| 4,716,514 | 12/1987 | Patel | 363/127 |
| 4,788,634 | 11/1988 | Schlecht et al. | 363/21 |
| 4,857,822 | 8/1989 | Tabisz et al. | 323/282 |
| 4,870,555 | 9/1989 | White | 323/21 |
| 4,903,189 | 2/1990 | Ngo et al. | 363/127 |
| 5,027,264 | 6/1991 | DeDoncker et al. | 363/16 |
| 5,066,900 | 11/1991 | Bassett | 323/224 |
| 5,099,406 | 3/1992 | Bassett . | |
| 5,126,931 | 6/1992 | Jitaru . | |
| 5,126,938 | 6/1992 | Oda | 364/413.16 |
| 5,291,382 | 3/1994 | Cohen | 363/16 |
| 5,303,138 | 4/1994 | Rozman | 363/21 |
| 5,304,875 | 4/1994 | Smith | 307/571 |
| 5,430,633 | 7/1995 | Smith | 363/20 |
| 5,434,768 | 7/1995 | Jitaru et al. | 363/21 |
| 5,528,482 | 6/1996 | Rozman | 363/21 |
| 5,708,571 | 1/1998 | Shinada | 363/16 |
| 5,742,491 | 4/1998 | Bowman et al. | 363/21 |

Gate Switch 2

FIG. 2A (Prior Art)

Gate Switch 5

FIG. 2B (Prior Art)

Voltage vp

FIG. 2C (Prior Art)

Gate Switch 9

FIG. 2D (Prior Art)

Gate Switch 10

FIG. 2E (Prior Art)

Current Switch

ACTIVE RESET FORWARD CONVERTER EMPLOYING SYNCHRONOUS RECTIFIERS

This patent claims priority based on copending U.S. Provisional Patent Application Ser. No. 60/086,835, filed May 26, 1998.

BACKGROUND OF THE INVENTION

This invention pertains to active reset forward converters employing synchronous rectifiers.

Carsten, "High Power SMPS Require Intrinsic Reliability," PCI Proceedings, Sep. 14, 1981, pp. 495–501, describes a single-ended forward converter comprising a reset circuit sometimes referred to as an "active clamp." The active clamp comprises a capacitor and switch coupled to a power transformer for resetting the transformer and preventing saturation. A similar circuit is discussed by Carsten in "Design Tricks, Techniques and Tribulations at High Conversion Frequencies", HFPC, April 1987, pp. 139–152, and "Techniques for Transformer Active Reset Circuits at High Frequencies and Power Levels", HFPC, May 1990, pp. 235–246. The Carsten articles are incorporated herein by reference.

The Carsten circuits employ an output filter circuit comprising diodes for receiving an AC voltage from the transformer secondary winding and generating therefrom a DC output voltage. It is known in the art to replace such diodes with MOSFETs, e.g. as described by James Blanc in "Practical Application of MOSFET Synchronous Rectifiers," published at the Intelec '91 conference, incorporated herein by reference.

Figure 1:
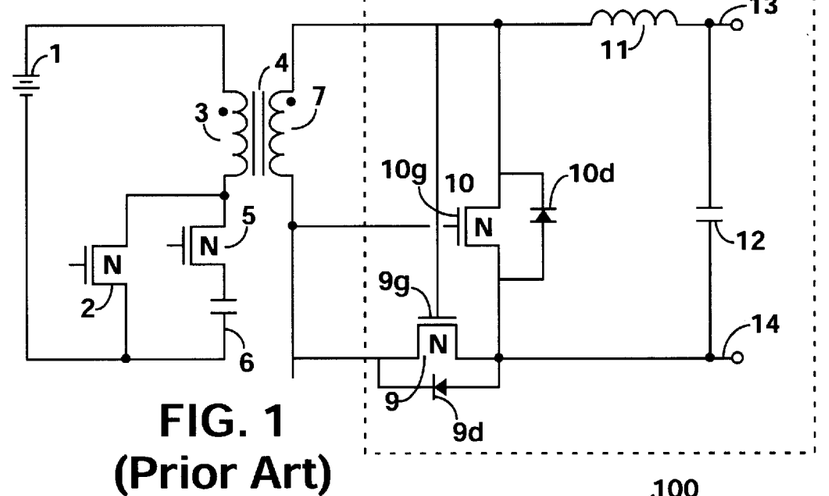
FIG. 1 illustrates a single-ended forward converter constructed in accordance with the prior art which comprises a main power switch, a reset switch, and a pair of synchronous rectifiers.

FIG. 1 illustrates a prior art circuit including a reset circuit combined with synchronous rectifiers. FIG. 1 includes a DC input voltage source 1. A main power switch 2 periodically turns on and off for coupling the DC input voltage across a primary winding 3 of an isolation transformer 4. A reset switch 5 and a capacitor 6 are included in this circuit. When main power switch 2 is off, switch 5 is closed, thereby coupling the series combination of capacitor 6 and input voltage source 1 across winding 3. Capacitor 6 typically stores a DC voltage such that the sum of the DC voltage on capacitor 6 plus the DC input voltage from supply 1 is sufficient to reset transformer 4 when switch 5 is closed. Thus, when switch 2 is closed, a positive DC input voltage is applied across primary winding 3, and when switch 5 is closed, a negative DC voltage (equal to the input voltage plus the voltage across capacitor 6) is applied across winding 3 to reset transformer 4.

Transformer 4 includes a secondary winding 7 coupled to a filter/rectifier circuit 8. Filter/rectifier circuit 8 includes synchronous rectifiers 9 and 10, an inductor 11 and a capacitor 12. Circuit 8 receives an output voltage waveform from secondary winding 7 and generates in response thereto a DC output voltage across output leads 13, 14. Synchronous rectifiers 9, 10 are MOS transistors, including parasitic diodes 9d, 10d coupled across their source and drain.

When switch 2 is closed, a positive voltage is present across winding 3, thereby causing a positive voltage across winding 7, which turns on synchronous rectifier 9 and turns off synchronous rectifier 10. When switch 5 is closed, a negative voltage is present across winding 3, thereby causing a negative voltage across winding 7, which turns off synchronous rectifier 9 and turns on synchronous rectifier 10. The advantage of using synchronous rectifiers 9, 10 instead of diodes is that the voltage drop across rectifiers 9, 10 is less than the voltage drop across a typical diode (0.7 volts), and therefore, efficiency of this circuit is enhanced.

Figure 2A:
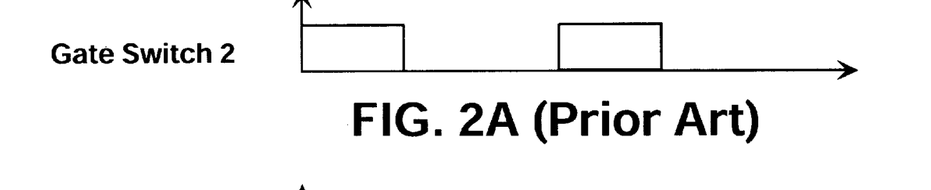
FIGS. 2A to 2F illustrate currents and voltages through and at various nodes of the circuit of FIG. 1.
Figure 2B:
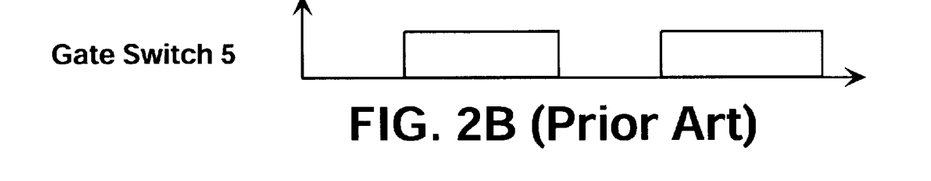
Figure 2C:
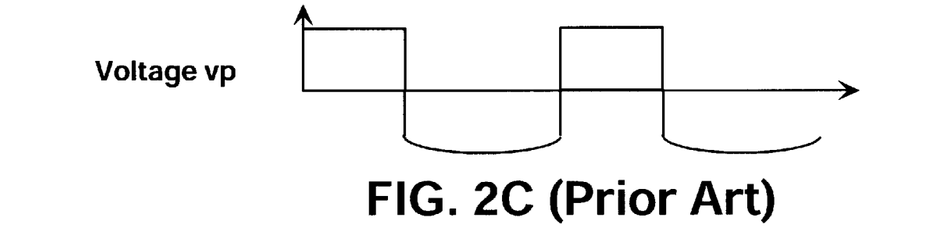

FIGS. 2A and 2B illustrate the gate voltage applied to MOS switches 2 and 5, respectively. As can be seen, these gate voltages are out of phase. FIG. 2C illustrates the voltage vp across winding 3 caused by transistors 2 and 5 turning on and off.

Figure 2D:
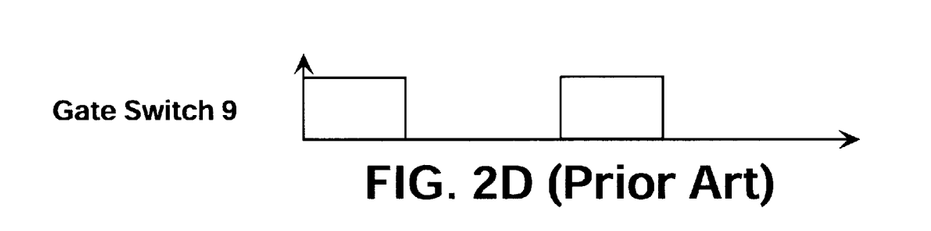
Figure 2E:
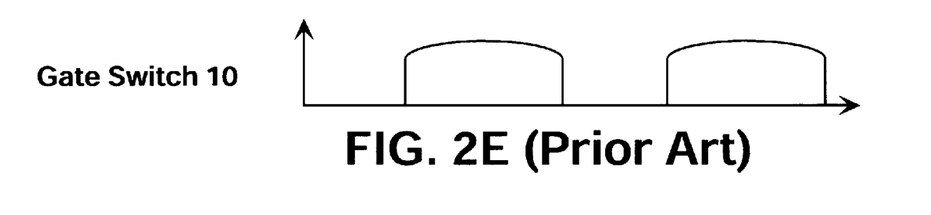
Figure 2F:
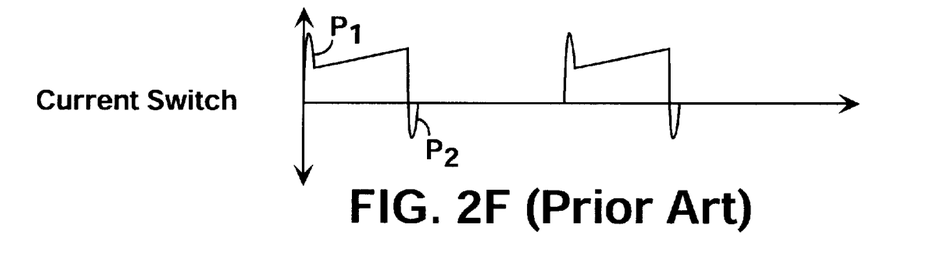

Unfortunately, the gates $9g$, $10g$ of MOS synchronous rectifiers 9, 10 are typically very capacitive. FIGS. 2D and 2E illustrate the voltage applied to gates $9g$, $10g$ of synchronous rectifiers 9, 10 by secondary winding 7. As can be seen, there is a small time period in which the voltages at gates $9g$, $10g$ are both high, thereby causing a small time period during which both rectifiers 9, 10 conduct, which in turn causes large current pulses P1, P2 to flow through rectifiers 9, 10 when rectifiers 9, 10 are both conducting. (The current through rectifier 9 is illustrated in FIG. 2F.) It would be desirable to eliminate these large current pulses.

SUMMARY

A circuit constructed in accordance with our invention comprises a main power switch for coupling an input voltage source to a primary winding of a transformer and a reset switch for coupling a reset voltage source to the primary winding. In one embodiment, the reset voltage source is a capacitor for storing a reset voltage. The circuit also comprises first and second synchronous rectifiers. One of the synchronous rectifiers acts as a freewheeling diode. The other synchronous rectifier selectively couples the secondary winding to an output filter circuit. The synchronous rectifiers are controlled by the transformer. A control circuit controls the main power switch and the reset switch. The control circuit comprises a delay circuit for providing a delay between the time the input switch opens and the reset switch closes, and a delay between the time the reset switch opens and the input switch closes. In accordance with one novel feature of our invention, this delay is sufficiently long to ensure that there is no time period during which both synchronous rectifiers are conducting.

DETAILED DESCRIPTION

Figure 3:
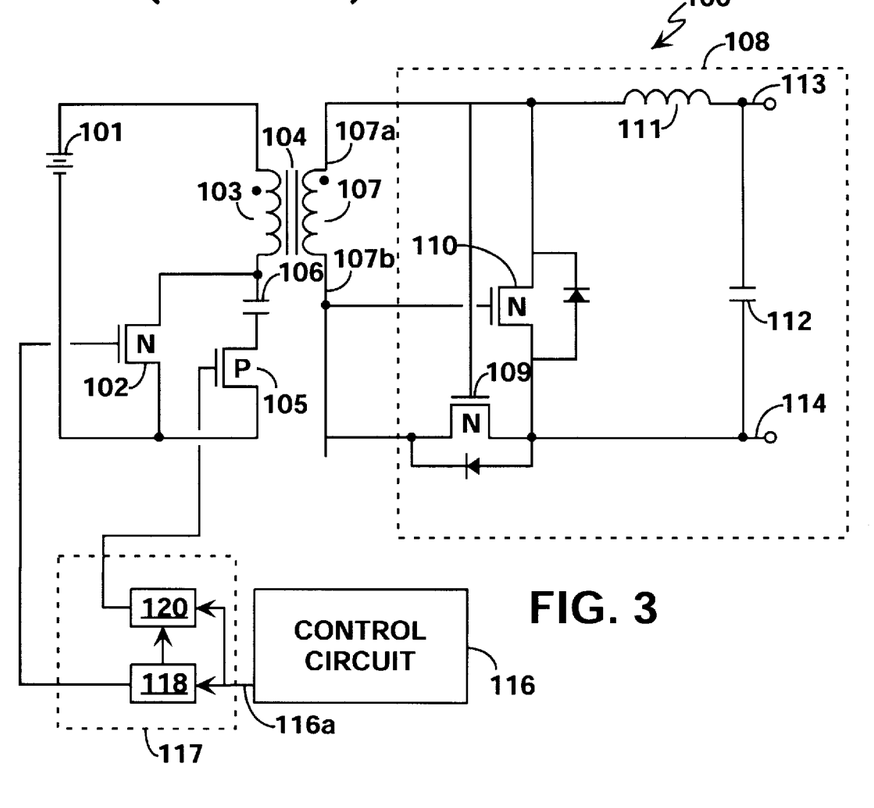
FIG. 3 illustrates a circuit constructed in accordance with our invention comprising a main power switch, a reset switch, a pair of synchronous rectifiers, and a control circuit which provides sufficient delay to ensure that the synchronous rectifiers are not on simultaneously.

Referring to FIG. 3, a circuit 100 constructed in accordance with our invention comprises a main power switch 102 for connecting an input DC voltage source 101 to a primary winding 103 of a transformer 104. A reset switch 105 and reset voltage source 106 provide a reset voltage across primary winding 103 during the time period in which switch 102 is off. In one embodiment, reset voltage source 106 is a capacitor which stores a reset voltage. The capacitance of capacitor 106 is typically sufficiently large so that in the steady state, over one switching cycle, the voltage across capacitor 106 does not change very much.

Circuit 100 includes a filter circuit 108 including synchronous rectifiers 109, 110 (typically MOS transistors), an inductor 111 and a capacitor 112 for receiving a voltage from secondary winding 107 and providing a DC output voltage at output terminals 113, 114. As can be seen, the control gate 109g of synchronous rectifier 109 is connected to a first terminal 107a of secondary winding 107, and the control gate 110g of synchronous rectifier 110 is coupled to a second terminal 107b of secondary winding 107.

In the embodiment of FIG. 3, transistor 102 and rectifiers 109 and 110 are N channel MOS transistors, and reset transistor 105 is a P channel MOS transistor. However, in other embodiments, these transistors can be other conductivity types, or other types of switches such as bipolar transistors or SCRs.

A control circuit 116 senses the output voltage across leads 113, 114 and in 110 response thereto provides a control signal on an output lead 116a for controlling switches 102 and 105. (The duty cycle of switches 102 and 105 is used by control circuit 116 to control the power supply output voltage.) Of importance, control circuit 116 is coupled to a network 117 comprising delay circuit 118 and delay and logic circuit 120 for providing a delay between the time switch 102 opens and switch 105 closes, and between the time switch 105 opens and switch 102 closes. Because of this delay, there is no overlap time in which both of synchronous rectifiers 109, 110 are closed. This delay time is longer than the time required to prevent the main and reset power switches from conducting simultaneously.

Figure 4A:
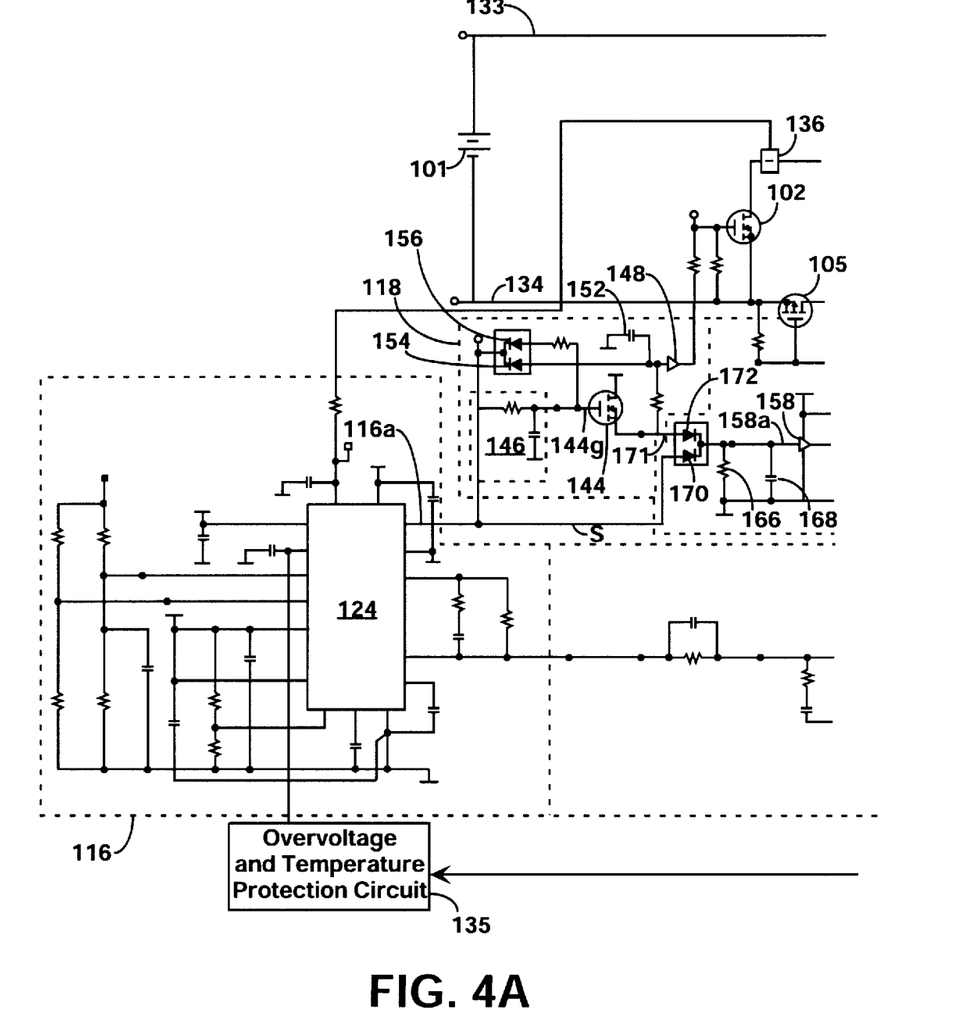
FIGS. 4A and 4B are a detailed schematic diagram of an embodiment of the circuit of FIG. 3.
Figure 4B:
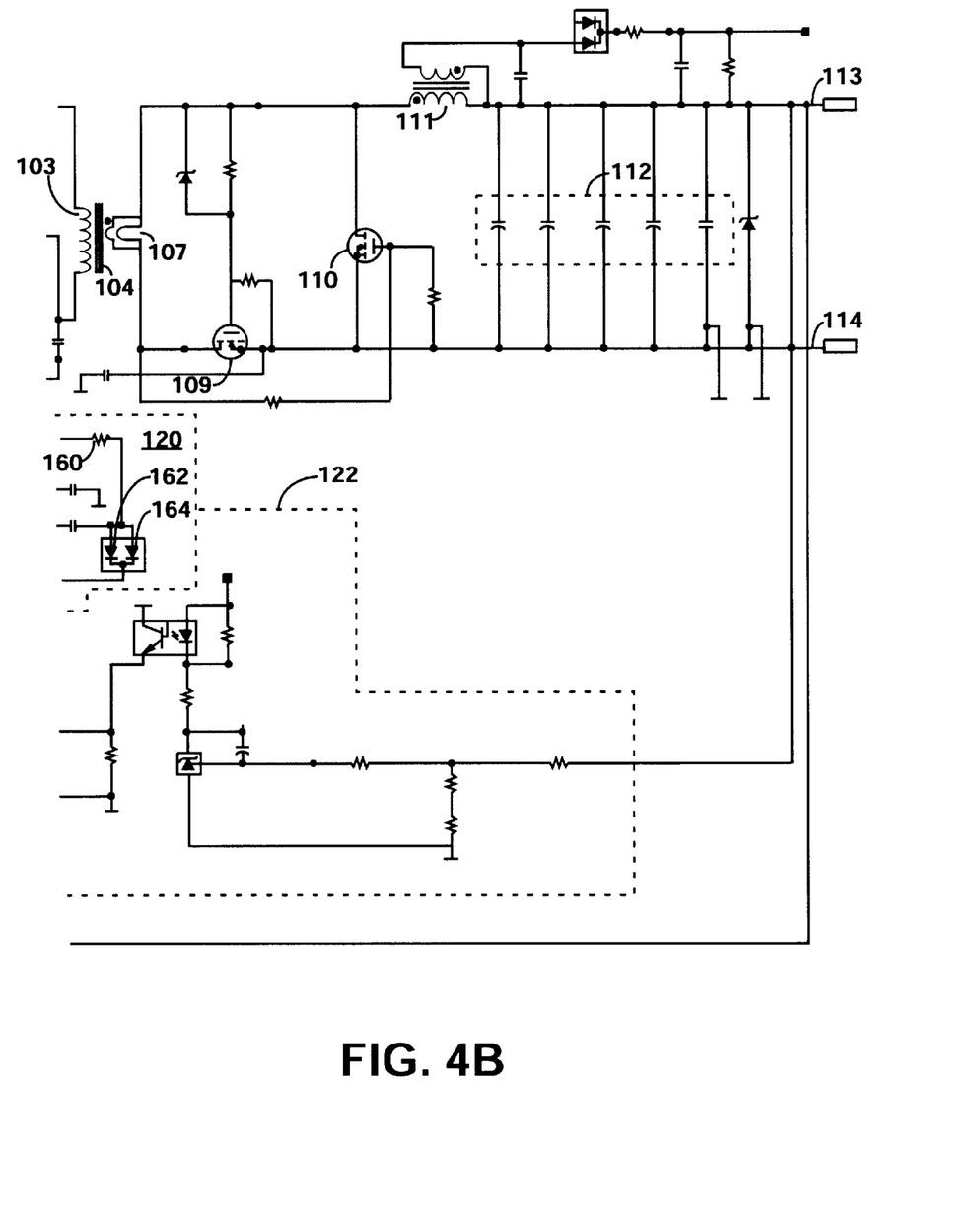

FIGS. 4A and 4B are a detailed schematic diagram of a circuit in accordance with our invention. In FIG. 4, the DC input voltage is applied across terminals 133, 134.

Control circuit 116 is coupled to a sense circuit 122 for sensing the voltage at output leads 113, 114. An integrated circuit 124 (which can be device type CS 51022 manufactured by Cherry Semiconductor of Rhode Island) provides an output signal S on lead 116a which alternates between a high level and a low level. Circuit 124 controls the voltage provided at terminals 113, 114 by controlling the duty cycle of signal S. When signal S transitions from a low state to a high state, a gate 144g of a transistor 144 is pulled high via an RC noise suppression circuit 146. Transistor 144 in turn pulls an input lead of a buffer 148 high via an RC delay circuit comprising a resistor 150 and a capacitor 152. Thus, the two RC circuits within delay circuit 118 ensure that transistor 102 does not turn on until a predetermined time period after signal S goes high from a low state to a high state. However, when signal S goes low, the input lead of buffer 148 and gate 144g of transistor 144 are pulled low almost immediately via diodes 154, 156. This causes the control signal driving power switch 102 to drop quickly, thereby turning off transistor 102. In summary, when signal S goes from a low state to a high state, transistor 102 will not turn on until a predetermined time delay period has elapsed, but when signal S goes from a high state to a low state, transistor 102 turns off almost immediately.

When signal S is in a high state, an input lead 158a of a buffer 158 within delay circuit 120 is pulled high. Buffer 158 is capacitively coupled to gate 105g of transistor 105. However, gate 105g is pulled to ground via resistor 160 and diodes 162, 164. Because source 105s of transistor 105 is at ground, and gate 105g is at ground, transistor 105 is off.

When signal S goes from a high state to a low state, the voltage at input lead 158a of buffer 158 cannot go low until the following happens:
1. First, diode 170 is turned off.
2. Second, the high to low transition of signal S must propagate through RC circuit 146 and transistor 144 to pull lead 171 low and turn diode 172 off.
3. Once diodes 170 and 172 are both off, lead 158a is gradually pulled to ground via an RC circuit comprising a resistor 166 and a capacitor 168.

Eventually, this causes buffer 158 to drive output lead 158b low, which in turn pulls gate 105g of P channel transistor 105 low to turn transistor 105 on. Because of this, when signal S transitions from a high state to a low state, transistor 105 will be turned on, but not until a predetermined time delay has elapsed dependent on the time constant of RC circuit 146 and the RC time constant of the circuit comprising resistor 166 and capacitor 168. In other words, transistor 105 cannot turn on until a safe time delay after transistor 102 is off.

When signal S transitions from a low state to a high state, input lead 158a of buffer 158 is pulled high immediately via diode 170, thereby causing buffer 158 to drive lead 158b high immediately, and turning off transistor 105 immediately.

Figure 9:
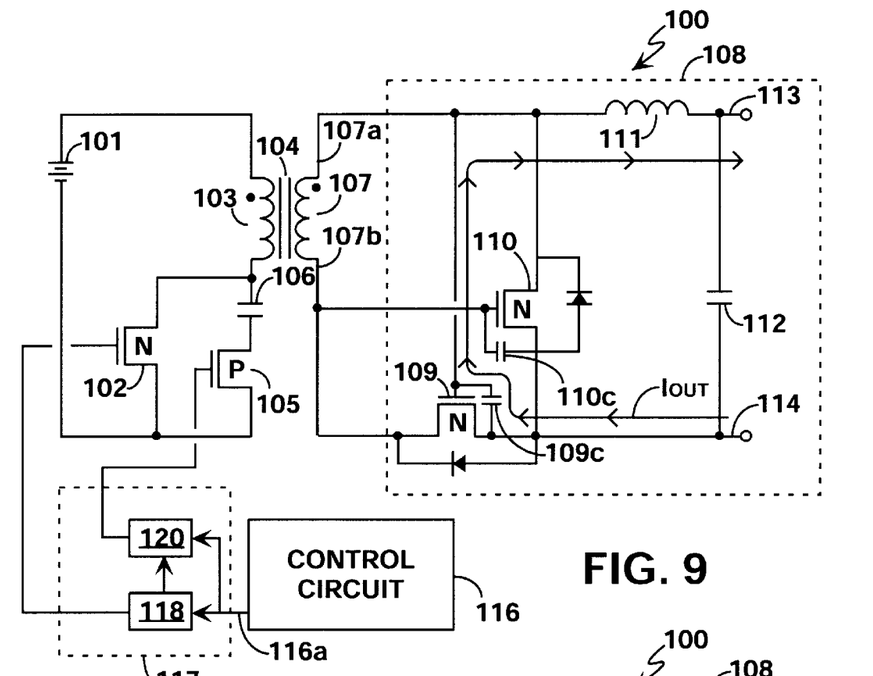
FIG. 9 illustrates the current path in the circuit of FIG. 3 during a first delay period.

It will be readily seen, therefore, that delay circuits 118 and 120 cooperate to ensure that there is a first delay period between the time transistor 102 turns off and the time transistor 105 turns on, and a second delay period between the time transistor 105 turns off and the time transistor 102 turns on. At the end of the power transfer cycle, switch 102 opens. Switch 105 is not closed until the first time delay period has elapsed. The output current is allowed to discharge the input capacitance of transistor 109 and turn off transistor 109. FIG. 9 shows the current path in circuit 100 as the output current $I_{out}$ discharges the input capacitance of transistor 109 (represented schematically by capacitor 109c) during the first delay period. Currently Previously flowing through transistor 109 is then diverted through its parallel diode. (In the embodiment of FIG. 4, this parallel diode is the body diode of transistor 109. However, instead of relying on the body diode, a fast diode can be coupled in parallel with transistor 109.) After the first delay period, transistor 105 is turned on, initiating the freewheeling cycle. Because switch 109 is open, no cross conduction will occur when switch 110 is closed.

Figure 10:
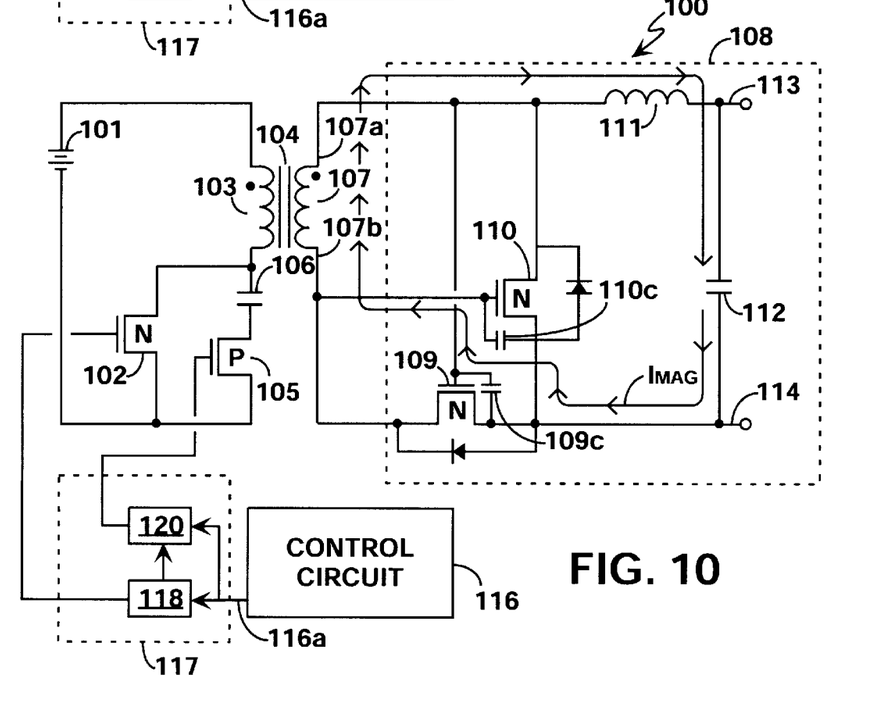
FIG. 10 illustrates the current patch in the circuit of FIG. 3 during a second delay period.

During the second delay period the voltage across windings 103 and 107 drops to zero. The magnetizing current is allowed to discharge the gate capacitance of transistor 110. Transistor 110 loses its driving signal and turns off. FIG. 10 shows the current path in circuit 100 as the magnetizing current $I_{mag}$ discharges the gate capacitance of transistor 110 (represented schematically as capacitor 110c) during the second delay period. Current previously flowing through transistor 110 is diverted to its parallel diode. (This may be the body diode of transistor 110 or a separate diode coupled in parallel with transistor 110.)

After the second delay period has elapsed, switch 102 closes, and subsequently switch 109 closes, initiating the power transfer cycle. Because switch 110 is open, no cross-conduction will occur when switch 109 is closed. The delay produced by circuits 118 and 120 is typically between 200 and 500 ns. If the delay is too short, cross conduction occurs in transistors 109, 110. If the delay is too long, circuit efficiency suffers. The required delay depends upon circuit parameters, and in other embodiments, other time delay values can be used.

Although not critical to our invention, FIG. 4 shows a circuit 135 for shutting down the power supply in the event of excessive temperature or excessive voltage across leads 113, 114. Also shown is a current sense circuit 136 for sensing current flowing from winding 103 through switch 102 and permitting current mode control. Circuits 135 and 136 are not critical to our invention and will not be discussed in detail.

In FIG. 4, winding 107 is shown as two 1-turn windings connected in parallel (which reduces electrical resistance therein), inductor 111 is implemented as a transformer, and capacitor 112 comprises several capacitors connected in parallel. However, in other embodiments, these structures can be implemented in other ways.

Figure 5:
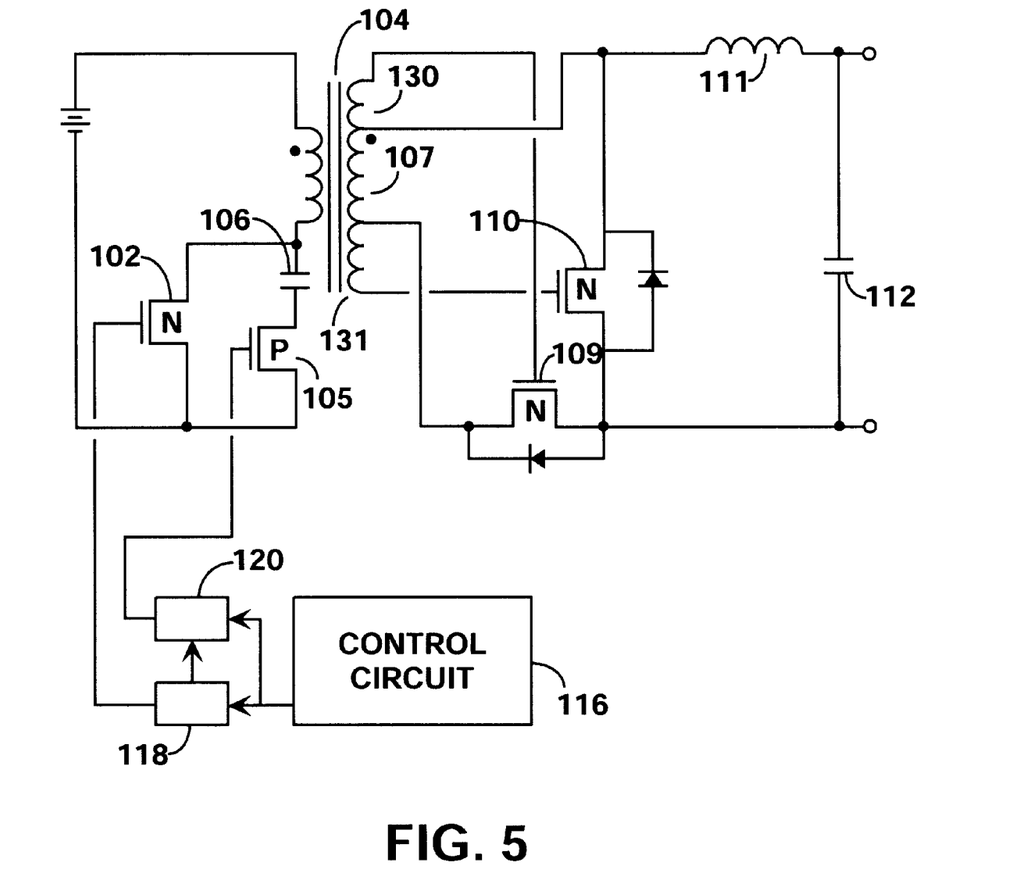
FIG. 5 illustrates a n embodiment of our invention in which extra windings are provided on the main transformer for controlling the synchronous rectifiers.

FIG. 5 illustrates another embodiment of our invention in which extra windings 130, 131 of transformer 104 provide the gate control signals for rectifiers 109, 110. The operation of the circuit of FIG. 5 is substantially the same as that of FIG. 3 except that windings 130, 131 provide a somewhat larger gate drive voltage to synchronous rectifiers 109, 110.

Figure 6:
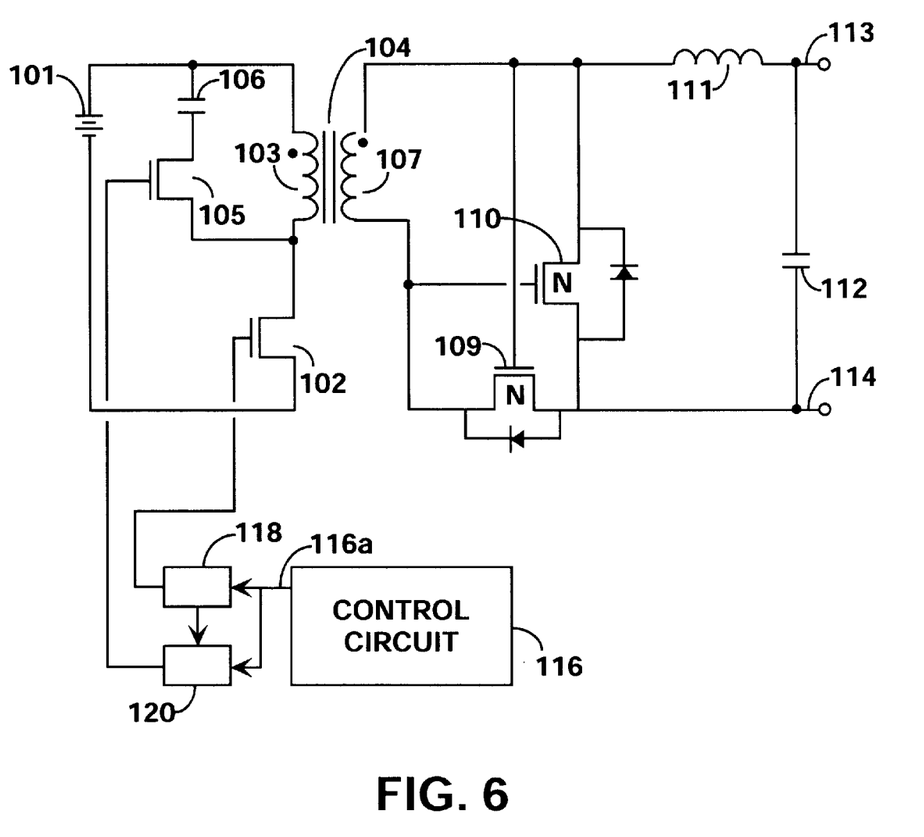
FIG. 6 illustrates an embodiment of our invention in which the reset circuit is connected directly across the primary winding of the main transformer.

FIG. 6 illustrates another embodiment of our invention in which the reset circuit comprising switch 105 and capacitor 106 is coupled directly across primary winding 103 of transformer 104. The circuit of FIG. 5 operates in a manner substantially similar to that of the reset FIG. 3, except in FIG. 5, capacitor 106 stores a voltage equal to the reset voltage applied to winding 103, whereas in FIG. 3, capacitor 106 stores a voltage equal to that reset voltage minus the input voltage.

Figure 7:
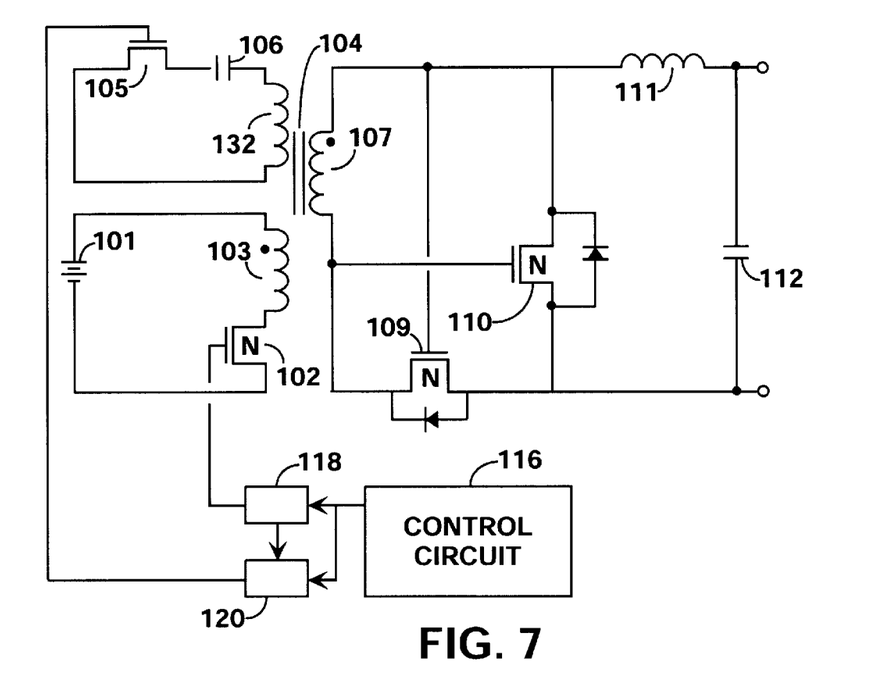
FIG. 7 illustrates an embodiment of our invention in which the reset circuit is connected across a tertiary winding of the main transformer.

FIG. 7 illustrates another embodiment of our invention in which reset circuit comprising switch 105 and capacitor 106 is coupled across a tertiary winding 132 of transformer 104. In FIG. 7, the reset voltage is applied across winding 132 to reset transformer 104.

Figure 8:
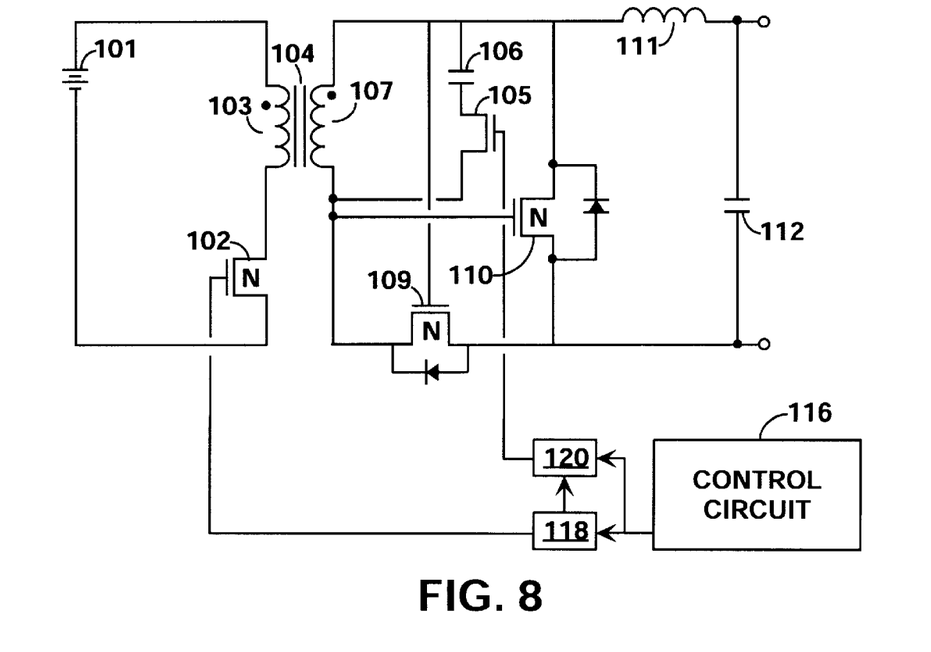
FIG. 8 illustrates an embodiment of our invention in which the reset circuit is connected across the secondary winding of the main transformer.

FIG. 8 illustrates another embodiment of our invention in which the reset circuit comprising switch 105 and capacitor 106 is coupled across the secondary winding of transformer 107.

While the invention has been described with respect to specific embodiments of our invention, those skilled in the art will appreciate that changes can be made in form and detail without departing from the spirit and scope of our invention. For example, the main and reset switches can be MOS transistors, bipolar transistors, or other types of switching devices. In lieu of a choke inductor such as inductor 111, a transformer can be used, e.g. as shown in FIG. 4. The order of circuit elements coupled in series (e.g. switch 102 and input voltage source 101 in FIGS. 6, 7 and 8) can be changed. In other embodiments, an output from delay circuit 118 is not coupled to delay circuit 120. For example, in other embodiments, diode 172 does not couple lead 171 to lead 158*a* (see FIG. 4). Accordingly, all such embodiments come within our invention.

What is claimed is:

1. A circuit comprising:

a transformer including primary and secondary windings;

a first switch for coupling a first input voltage to said transformer;

a second switch for coupling a reset voltage to said transformer;

a rectification circuit including a first synchronous rectifier for coupling said secondary winding to an output lead and a second synchronous rectifier for serving as a freewheeling diode, said first and second synchronous rectifiers including control leads coupled to said transformer; and a control circuit for controlling said first and second switches, and for providing a delay between the time said second switch opens and said first switch closes and for providing a delay between the time said first switch opens and said second switch closes, said delays being sufficiently long to ensure that said first and second synchronous rectifiers are not simultaneously conducting, said control circuit including:

a duty cycle control circuit having first and second input terminals coupled to output leads of said rectification circuit, and having an output terminal;

a first RC delay circuit coupled between said output terminal of the said duty cycle control circuit and a control terminal of said first switch;

a first diode having an anode coupled to said control terminal of said first switch and a cathode coupled to said output terminal of said duty cycle control circuit;

a second RC delay circuit coupled to said output terminal of said duty cycle control circuit and coupled a control terminal of said second switch; and a second diode having an anode coupled to said control terminal of said second switch and a cathode coupled to a first reference voltage rail.

2. Circuit of claim 1, wherein said first and second synchronous rectifiers are MOS transistors having gates coupled to said secondary winding and said first and second switches are MOS transistors.

3. The circuit of claim 1, wherein said second RC delay circuit is coupled to said control terminal of said second switch by a capacitor between said second RC delay circuit and said control terminal of said second switch.

4. The circuit of claim 3, wherein said control circuit further includes a first buffer having an input terminal coupled to said anode of said first diode and said first RC delay circuit and an output terminal coupled to said control terminal of said first switch.

5. The circuit of claim 4, wherein said control circuit further includes a transistor having a control terminal and a conduction path between first and second terminals, wherein said control terminal is coupled to said output terminal of said duty cycle control circuit, said first terminal is coupled to a second reference voltage rail, and said second terminal is coupled to said input terminal of said first buffer.

6. The circuit of claim 5, wherein said control circuit further includes an RC noise suppression circuit coupled between said output terminal of said duty cycle control circuit and said control terminal of said transistor.

7. The circuit of claim 6, wherein said control circuit further includes a third diode having an anode coupled to said control terminal of said transistor and a cathode coupled to said cathode of said first diode.

8. The circuit of claim 6, wherein said control circuit further includes a second buffer having an input terminal coupled to said second RC delay circuit and an output terminal capacitively coupled to said control terminal of said second switch.

9. The circuit of claim 8, wherein said control circuit further includes a fourth diode having an anode coupled to said output terminal of said duty control and a cathode coupled to said second RC delay circuit.

10. The circuit of claim 9, wherein said control circuit further includes a fifth diode having a anode coupled to said second terminal of said transistor and a cathode coupled to said second RC delay circuit.

11. The circuit of claim 10, wherein said second RC delay circuit is coupled to said first reference voltage rail.

12. The circuit of claim 11, wherein said first reference voltage rail is grounded.

13. A circuit, comprising:
   a transformer including primary and secondary windings;
   a primary switch including a control terminal, and said primary switch coupling an input voltage to said transformer;
   a reset circuit having a control terminal, and said reset circuit coupled to said transformer;
   a rectification circuit coupled to said secondary winding and having a pair of output terminals;
   a duty cycle control circuit having first and second input terminals coupled to said output terminals of said rectification circuit, and having an output terminal;
   a first RC delay circuit coupled between said output terminal of the said duty cycle control circuit and said control terminal of said primary switch;
   a first diode having an anode coupled to said control terminal of said primary switch and a cathode coupled to said output terminal of said duty cycle control circuit;
   a second RC delay circuit coupled between said output terminal of said duty cycle control circuit and said control terminal of said reset circuit; and
   a second diode having an anode coupled to said control terminal of said reset circuit and a cathode coupled to a first reference voltage rail.

14. The circuit of claim 13, further comprising a capacitor coupled between said second RC delay circuit and said control terminal of said reset circuit.

15. The circuit of claim 13, wherein said reset circuit includes a reset switch coupled to a reset capacitor.

16. The circuit of claim 13, wherein said reset circuit is coupled to a winding of said transformer, said winding selected from the group consisting of said primary winding, said secondary winding, and a tertiary winding.

17. A control circuit for an active reset forward converter, said converter including a primary switch coupled to a transformer, a reset circuit coupled to said transformer, and a rectification circuit coupled to said transformer, comprising:
   a duty cycle control circuit having first and second input terminals coupled to output terminals of said rectification circuit, and having an output terminal;
   a first RC delay circuit coupled between said output terminal of the said duty cycle control circuit and said control terminal of said primary switch;
   a first diode having an anode coupled to said control terminal of said primary switch and a cathode coupled to said output terminal of said duty cycle control circuit;
   a second RC delay circuit coupled between said output terminal of said duty cycle control circuit and said control terminal of said reset circuit; and
   a second diode having an anode coupled to said control terminal of said reset circuit and a cathode coupled to a first reference voltage rail.

18. The control circuit of claim 17, further comprising a capacitor coupled between said second RC delay circuit and said control terminal of said reset circuit.

19. The circuit of claim 14, further comprising a first buffer having an input terminal coupled to said anode of said first diode and said first RC delay circuit and an output terminal coupled to said control terminal of said primary switch.

20. The circuit of claim 19, further comprising a transistor having a control terminal and a conduction path between first and second terminals, wherein said control terminal is coupled to said output terminal of said duty cycle control circuit, said first terminal is coupled to a second reference voltage rail, and said second terminal is coupled to said input terminal of said first buffer.

21. The circuit of claim 20, further comprising an RC noise suppression circuit coupled between said output terminal of said duty cycle control circuit and said control terminal of said transistor.

22. The circuit of claim 21, further comprising a third diode having an anode coupled to said control terminal of said transistor and a cathode coupled to said cathode of said first diode.

23. The circuit of claim 22, further comprising a second buffer having an input terminal coupled to said second RC delay circuit and an output terminal capacitively coupled to said control terminal of said reset circuit.

24. The circuit of claim 23, further comprising a fourth diode having an anode coupled to said output terminal of said duty control and a cathode coupled to said second RC delay circuit.

25. The circuit of claim 24, further comprising a fifth diode having an anode coupled to said second terminal of said transistor and a cathode coupled to said second RC delay circuit.

26. The circuit of claim 25, wherein said second RC delay circuit is coupled to said first reference voltage rail.

27. The control circuit of claim 18, further comprising a first buffer having an input terminal coupled to said anode of said first diode and said first RC delay circuit and an output terminal coupled to said control terminal of said primary switch.

28. The control circuit of claim 27, further comprising a transistor having a control terminal and a conduction path between first and second terminals, wherein said control terminal is coupled to said output terminal of said duty cycle control circuit, said first terminal is coupled to a second reference voltage rail, and said second terminal is coupled to said input terminal of said first buffer.

29. The control circuit of claim 28, further comprising an RC noise suppression circuit coupled between said output terminal of said duty cycle control circuit and said control terminal of said transistor.

30. The control circuit of claim 29, further comprising a third diode having an anode coupled to said control terminal of said transistor and a cathode coupled to said cathode of said first diode.

31. The control circuit of claim 30, further comprising a second buffer having an input terminal coupled to said second RC delay circuit and an output terminal capacitively coupled to said control terminal of said reset circuit.

32. The control circuit of claim 30, further comprising a fourth diode having an anode coupled to said output terminal of said duty control and a cathode coupled to said second RC delay circuit.

33. The control circuit of claim 32, further comprising a fifth diode having an anode coupled to said second terminal of said transistor and a cathode coupled to said second RC delay circuit.

34. The control circuit of claim 33, wherein said second RC delay circuit is coupled to said first reference voltage rail.

* * * * *